US008102755B2

(12) United States Patent
Dai et al.

(10) Patent No.: US 8,102,755 B2
(45) Date of Patent: Jan. 24, 2012

(54) METHOD FOR MAPPING A PHYSICAL DOWNLINK CONTROL FORMAT INDICATOR CHANNEL TO PHYSICAL RESOURCES

(75) Inventors: Bo Dai, Shenzhen (CN); Shuqiang Xia, Shenzhen (CN); Zhisong Zuo, Shenzhen (CN); Guanghui Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 182 days.

(21) Appl. No.: 12/673,452

(22) PCT Filed: Oct. 22, 2008

(86) PCT No.: PCT/CN2008/072789
§ 371 (c)(1),
(2), (4) Date: Feb. 12, 2010

(87) PCT Pub. No.: WO2009/059517
PCT Pub. Date: May 14, 2009

(65) Prior Publication Data
US 2011/0228729 A1    Sep. 22, 2011

(30) Foreign Application Priority Data
Nov. 2, 2007  (CN) .......................... 2007 1 0169605

(51) Int. Cl.
*H04J 11/00* (2006.01)
(52) U.S. Cl. ......... 370/208; 370/343; 370/482; 375/267
(58) Field of Classification Search .................. None
See application file for complete search history.

(56) References Cited

U.S. PATENT DOCUMENTS

2005/0063327 A1*  3/2005  Krauss et al. ................. 370/320
2008/0253469 A1* 10/2008  Ma et al. ....................... 375/260

FOREIGN PATENT DOCUMENTS

| CN | 101043495 A | 9/2007 |
| CN | 101043718 A | 9/2007 |
| CN | 101060713 A | 10/2007 |
| CN | 101159470 A | 4/2008 |

OTHER PUBLICATIONS

"3rd Generation Partnership Project: Technical Specification Group Radio Access Network; Evolved Universal Terrestrial Radio Acess (E-ULTRA); Physical Channels and Modulation (Release 8)", 3GPP TS 36.211 V8.1.0, Nov. 2007.*

(Continued)

*Primary Examiner* — Seema S Rao
*Assistant Examiner* — Khoa Huynh
(74) *Attorney, Agent, or Firm* — Oppedahl Patent Law Firm LLC

(57) ABSTRACT

A method for mapping a physical downlink control format indicator channel to physical resources includes the steps that 16 modulated data y(0), y(1), . . . , y(15) of a downlink control signaling indicator channel in an LTE system are divided into 4 groups in order and mapped by groups, which allows the downlink control format indicator channel to be mapped exactly to the continuous 4 resource elements recombined by resources which are divided among all system physical resources except the pilots according to such continuous 4 resource elements. By defining group mapping rules, this method can offer the maximum gain of frequency selectivity.

5 Claims, 4 Drawing Sheets

OTHER PUBLICATIONS

Notification of the First Office Action in Australian application No. 2008324614, mailed on Nov. 5, 2010.

Notification of Acceptance in Australian application No. 2008324614, mailed on Jan. 5, 2011.

International Search Report in international application No. PCT/CN2008/072789, mailed Jan. 22, 2009.

International Search Report and Written Opinion of the International Searching Authority in International Application No. PCT/CN2008/072789, mailed Jan. 22, 2009.

Notification of the First Office Action in Korean Application No. 10-2010-7002344, mailed on Feb. 18, 2011.

* cited by examiner

METHOD FOR MAPPING A PHYSICAL DOWNLINK CONTROL FORMAT INDICATOR CHANNEL TO PHYSICAL RESOURCES

CROSS REFERENCES TO RELATED APPLICATIONS

This application is a U.S. national phase application, pursuant to 35 U.S.C. §371, of PCT/CN2008/072789 filed on Oct. 22, 2008, which claims priority to Chinese Application No. 200710169605.3 filed Nov. 2, 2007. The entire contents of the aforementioned patent applications are incorporated herein by this reference.

TECHNICAL FIELD

The present invention relates to the field of broadband wireless communication systems, especially to a method for mapping a physical downlink control format indicator channel to physical resources in a 3GPP Long Term Evolution (shortened as LTE) system.

BACKGROUND

In an LTE system, since resources exist in two dimensions, i.e. time and frequency. Accordingly, the allocation of the resources and their representation method become quite complicated, especially when a bandwidth is relatively wide, consideration must be given to such requirements as not only the flexibility of the resources allocation but also the size of the related bandwidth, etc.

FIG. 1 is a schematic illustration of a resource block and a resource element in a 3GPP LTE (with 5M-bandwidth) system. It is specified in the LTE system that the length of a sub-frame in time is 1 ms, and one sub-frame is comprised of two equal time slots (Time Slot 1 and Time Slot 2), the length of time of each time slot is 0.5 ms. One resource element contains one Orthogonal Frequency Division Multiplexing (shortened as OFDM) symbol, and one subcarrier in each OFDM symbol belongs to the resource element. While the usual method of resource representation is defining a basic Resource Block (shortened as RB), and then carrying out the resources allocation in the unit of RB.

In the LTE system, a downlink mainly includes multiple downlink channels such as a Physical Control Format Indicator Channel (shortened as PCFICH), etc. A representation method for mapping a physical downlink control format indicator channel to physical resources is given in a current draft standard, which is specifically described as below:

mapping $y(0), \ldots y(3)$ to the resource elements in which a resource element group k locates, and $k=k_0$;

mapping $y(4), \ldots y(7)$ to the resource elements in which a resource element group k locates, and $k=k_0+\lfloor N_{RB}^{DL}/4 \rfloor$;

mapping $y(8), \ldots y(11)$ to the resource elements in which a resource element group k locates, and $k=k_0+\lfloor 2N_{RB}^{DL}/4 \rfloor$;

mapping $y(12), \ldots y(15)$ to the resource elements in which a resource element group k locates, and $k=k_0+\lfloor 3N_{RB}^{DL}/4 \rfloor$;

wherein, $k_0=N_{ID}^{cell} \mod(N_{RB}^{DL}/2$, and it is necessary to carry out a modulus of $N_{RB}^{DL}N_{sc}^{RB}$ on k;

wherein, $y(0), \ldots, y(15)$ stand for the data in the physical downlink control format indicator channel after code modulation, and the $N_{RB}^{DL}$ stands for the quantity of resource blocks in the system bandwidth, and the $N_{ID}^{cell}$ is the proprietary ID (identity) of each cell.

Taking the 3GPP LTE (with 5M-bandwidth) system for example, as shown in FIG. 1, a 5M-bandwidth downlink in the LTE contains a total of 512 subcarriers, the 300 of which in the middle are usable subcarriers; each resource block contains continuous 12 subcarriers, therefore the 5M bandwidth contains a total of 25 resource blocks.

One resource block contains 4 pilot elements, and except the pilots, every four remaining resources elements are combined into a resource element group, so there are a total of 50 resource element groups.

The physical downlink control format indicator channel is mapped to the first OFDM symbol in a sub-frame.

Assuming that the ID of the target cell is 13 and that the initial position of the pilot on the first antenna port is the third subcarrier, then:

according to the existing technologies, and $k_0=N_{ID}^{cell} \mod (N_{RB}^{DL}/2)$; when the $N_{RB}^{DL}$ is an odd number, the $k_0$ would be a decimal number, which does not offer any practical physical meaning; and moreover, even if $k_0=N_{ID}^{cell} \mod(\lfloor N_{RB}^{DL}/2 \rfloor)$ or $k_0=N_{ID}^{cell} \mod(\lceil N_{RB}^{DL}/2 \rceil)$, there is still a problem that the performance is not optimal.

$y(0), \ldots y(15)$ in the physical downlink control format indicator channel are mapped to the following physical resources by dividing 4 continuous subcarriers in order except the pilots into one group:

wherein, $y(0), \ldots, y(15)$ stand for the data in the physical downlink control format indicator channel after code modulation; the $N_{RB}^{DL}$ stands for the quantity of the resource blocks in the system bandwidth; and the $N_{ID}^{cell}$ is the proprietary ID of each cell.

$k_0=N_{ID}^{cell} \mod(N_{RB}^{DL}/2)=13 \mod(\lfloor 25/2 \rfloor)=1$, and it is necessary to carry out a modulus of $N_{RB}^{DL} \times N_{sc}^{RB}=25 \times 12=300$ on k;

$y(0), \ldots y(3)$ are mapped to the resource elements in which a resource element group k locates, and $k=k_0=1$;

$y(4), \ldots y(7)$ are mapped to the resource elements in which the resource element group k locates, and $k=k_0+\lfloor N_{RB}^{DL}/4 \rfloor=1\lfloor 25/4 \rfloor=7$;

$y(8), \ldots y(11)$ are mapped to the resource elements in which the resource element group k locates, and $k=k_0+\lfloor 2 \times N_{RB}^{DL}/4 \rfloor=1+\lfloor 2 \times N_{RB}^{DL}/4 \rfloor=13$; and $y(12), \ldots y(15)$ are mapped to the resource elements in which the resource element group k locates, and $k=k_0+\lfloor 3 \times N_{RB}^{DL}/4 \rfloor=1+\lfloor 3 \times 25/4 \rfloor=19$.

FIG. 2 is a schematic illustration of mapping a physical downlink control format indicator channel in a 3GPP LTE (with 5M-bandwidth) system according to relevant technologies. As shown in FIG. 2, the code-modulated data $y(0), \ldots, y(15)$ in the downlink control format indicator channel are mapped to the resource elements numbered 6, 7, 9, 10 and 42, 43, 45, 46 as well as 78, 79, 81, 82 and 114, 115, 117, 118.

It can be seen in FIG. 2 that the range of physical elements which are mapped to a physical downlink control format indicator channel by the existing solution is only half of the bandwidth, without obtaining a maximum gain of frequency selectivity.

In the LTE system, the resources in the physical downlink control format indicator channel are allocated based on 4 continuous subcarriers as a group, while in the system bandwidth and except the pilots, the resources are divided into groups of 4 continuous subcarriers (the pilots are skipped over if they are encountered), so the total number of the groups is $2N_{RB}^{DL}$ (because one RB contains 12 carriers, while one RB also contains 4 subcarriers used for dual-antenna pilots). And there are 16 modulated data in the physical downlink control format indicator channel which need to be mapped onto 4 groups (each group has 4 subcarriers). If mapping should be carried out according to the formula in the above mentioned draft standard, then the data in the physical downlink control format indicator channel would be distributed unevenly over the entire system bandwidth, and thereby that is unable to obtain the maximum gain of frequency diversity.

SUMMARY

The present invention aims to solve the problem of uneven distribution of PCFICH data over the entire system bandwidth caused by the mapping methods in relevant technologies through providing a method for mapping a physical downlink control format indicator channel to physical resources.

The present invention provides a method for mapping a physical downlink control format indicator channel to physical resources, comprising: mapping data $y(0), \ldots y(15)$ in a physical downlink control format indicator channel to physical resources according to the following method by combining 4 continuous subcarriers in order except the pilots into a group: $y(0), \ldots y(3)$ are mapped to the resource elements in which a resource element group $k1=k_0$ locates; $y(4), \ldots y(7)$ are mapped to the resource elements in which a resource element group $k2=k_0+\lfloor N_{RB}^{DL}/2 \rfloor$ locates; $y(8), \ldots y(11)$ are mapped to the resource elements in which a resource element group $k3=k_0+\lfloor 2N_{RB}^{DL}/2 \rfloor=k_0+\lfloor N_{RB}^{DL} \rfloor$ locates; $y(12), \ldots y(15)$ are mapped to the resource elements in which a resource element group $k4=k_0+\lfloor 3N_{RB}^{DL}/2 \rfloor$ locates; wherein: $k_0=N_{ID}^{cell} \bmod(\lfloor N_{RB}^{DL}/2 \rfloor)$, and the $N_{RB}^{DL}$ stands for the quantity of resource blocks in the system bandwidth, and the $N_{ID}^{cell}$ is the proprietary ID of each cell.

The present invention also provides a method for mapping a physical downlink control format indicator channel to physical resources, comprising: mapping data $y(0), \ldots y(15)$ in a physical downlink control format indicator channel to physical resources according to the following method by combining 4 continuous subcarriers in order except the pilots into a group: mapping $y(0), \ldots y(3)$ to the resource elements in which a resource element group $k1=k_0 \bmod(2 \times N_{RB}^{DL})$ locates; $y(4), \ldots y(7)$ are mapped onto the resource elements in which a resource element group $k2=(k_0+\lfloor N_{RB}^{DL}/2 \rfloor) \bmod (2 \times N_{RB}^{DL})$ locates; mapping $y(8), \ldots y(11)$ to the resource elements in which a resource element group $k3=(k_0+\lfloor N_{RB}^{DL} \rfloor) \bmod(2 \times N_{RB}^{DL})$ locates; mapping $y(12), \ldots y(15)$ to the resource elements in which a resource element group $k4=(k_0+\lfloor 3N_{RB}^{DL}/2 \rfloor) \bmod(2 \times N_{RB}^{DL})$ locates; wherein: $k_0=N_{ID}^{cell} \bmod(X \ast N_{RB}^{DL})$, and the $N_{RB}^{DL}$ stands for the quantity of resource blocks in the system bandwidth, and the $N_{ID}^{cell}$ is the proprietary ID of each cell, and the X is a positive integer.

Furthermore, when the X is 1, $k_0=N_{ID}^{cell} \bmod(N_{RB}^{DL})$. At this time, mapping data $y(0), \ldots y(15)$ in a physical downlink control format indicator channel to physical resources according to the following method by combining 4 continuous subcarriers in order except the pilots into a group: $y(0), \ldots y(3)$ may be mapped to the resource elements in which a resource element group $k1=k_0 \bmod(2 \times N_{RB}^{DL})$ locates; $y(4), \ldots y(7)$ may be mapped to the resource elements in which a resource element group $k2=(k_0+\lfloor N_{RB}^{DL}/2 \rfloor) \bmod(2 \times N_{RB}^{DL})$ locates; $y(8), \ldots y(11)$ may be mapped to the resource elements in which a resource element group $k3=(k_0+\lfloor N_{RB}^{DL} \rfloor) \bmod(2 \times N_{RB}^{DL})$ locates; and $y(12), \ldots y(15)$ may be mapped to the resource elements in which a resource element group $k4=(k_0+\lfloor 3N_{RB}^{DL}/2 \rfloor) \bmod(2 \times N_{RB}^{DL})$ locates.

Furthermore, when the X is 2, $k_0=N_{ID}^{cell} \bmod(2 \times N_{RB}^{DL})$. At this time, mapping data $y(0), \ldots y(15)$ in a physical downlink control format indicator channel to physical resources according to the following method by combining 4 continuous subcarriers in order except the pilots into a group: $y(0), \ldots y(3)$ may be mapped to the resource elements in which a resource element group $k1=k_0 \bmod(2 \times N_{RB}^{DL})$ locates; $y(4), \ldots y(7)$ may be mapped to the resource elements in which a resource element group $k2=(k_0+\lfloor N_{RB}^{DL}/2 \rfloor) \bmod(2 \times N_{RB}^{DL})$ locates; $y(8), \ldots y(11)$ may be mapped to the resource elements in which a resource element group $k3=(k_0+\lfloor N_{RB}^{DL} \rfloor) \bmod(2 \times N_{RB}^{DL})$ locates; and $y(12), \ldots y(15)$ may be mapped to the resource elements in which a resource element group $k4=(k_0+\lfloor 3N_{RB}^{DL}/2 \rfloor) \bmod(2 \times N_{RB}^{DL})$ locates.

Furthermore, when the X is 2, $k_0=N_{ID}^{cell} \bmod(2 \times N_{RB}^{DL})$; at this time, mapping data $y(0), \ldots y(15)$ in a physical downlink control format indicator channel to physical resources according to the following method by combining 4 continuous subcarriers in order except the pilots into a group: $y(0), \ldots y(3)$ may be mapped to the resource elements in which a resource element group $k1=N_{ID}^{cell} \bmod(2 \times N_{RB}^{DL})$ locates; $y(4), \ldots y(7)$ may be mapped to the resource elements in which a resource element group $k2=(N_{ID}^{cell}+\lfloor N_{RB}^{DL}/2 \rfloor) \bmod(2 \times N_{RB}^{DL})$ locates; $y(8), \ldots y(11)$ may be mapped to the resource elements in which a resource element group $k3=(N_{ID}^{cell}+\lfloor N_{RB}^{DL} \rfloor) \bmod(2 \times N_{RB}^{DL})$ locates; and $y(12), \ldots y(15)$ may be mapped to the resource elements in which a resource element group $k4=(N_{ID}^{cell}+\lfloor 3N_{RB}^{DL}/2 \rfloor) \bmod(2 \times N_{RB}^{DL})$ locates.

The present invention can offer the maximum gain of frequency diversity by defining group mapping rules to achieve even distribution of the data in a physical downlink control format indicator channel over the entire system bandwidth.

BRIEF DESCRIPTION OF THE DRAWINGS

The drawings described here are used to provide further understanding of the present invention and constitute a part of the present invention, and the illustrative embodiments for the present invention and their explanations are used to interpret the present invention and do not constitute any improper restriction on the present invention. Among the drawings.

DETAILED DESCRIPTION

The exemplary embodiments of the present invention are described below based on the drawings attached; it should be understood that the exemplary embodiments described here are only used to describe and explain the present invention rather than limit the present invention.

Functional Overview

The main idea of the present invention is that: the 16 modulated data $y(0), y(1), \ldots, y(15)$ in a downlink control signaling indicator channel in the LTE system are divided into 4 groups in sequential order and mapped by groups, which allows the downlink control format indicator channel to be mapped exactly to continuous 4 resource elements recombined by resource element groups which are divided among all system physical resources except the pilots according to such continuous 4 resource elements in order to offer the maximum gain of frequency selectivity.

The present invention provides a method for mapping a physical downlink control format indicator channel to physical resources, comprising: mapping the data $y(0), \ldots y(15)$ in a downlink control format indicator channel to physical resources according to the following method by combining 4 continuous subcarriers in order except the pilots into a group:

Method (1)

Mapping the data $y(0), \ldots y(15)$ in a physical downlink control format indicator channel to physical resources according to the following method by combining 4 continuous subcarriers in order except the pilots into a group:

$y(0), \ldots y(3)$ are mapped to the resource elements in which a resource element group $k1=k_0$ locates;

$y(4), \ldots y(7)$ are mapped to the resource elements in which a resource element group $k2=k_0+\lfloor N_{RB}^{DL}/2 \rfloor$ locates;

$y(8), \ldots y(11)$ are mapped to the resource elements in which a resource element group $k3=k_0+\lfloor 2N_{RB}^{DL}/2 \rfloor$ locates;

$y(12), \ldots y(15)$ are mapped to the resource elements in which a resource element group $k4=k_0+\lfloor 3N_{RB}^{DL}/2 \rfloor$ locates; and wherein, $k_0=N_{ID}^{cell} \mod(\lfloor N_{RB}^{DL}/2 \rfloor)$, and the $N_{RB}^{DL}$ stands for the quantity of resource blocks in the system bandwidth, and the $N_{ID}^{cell}$ is the proprietary ID of each cell.

Figure 1:
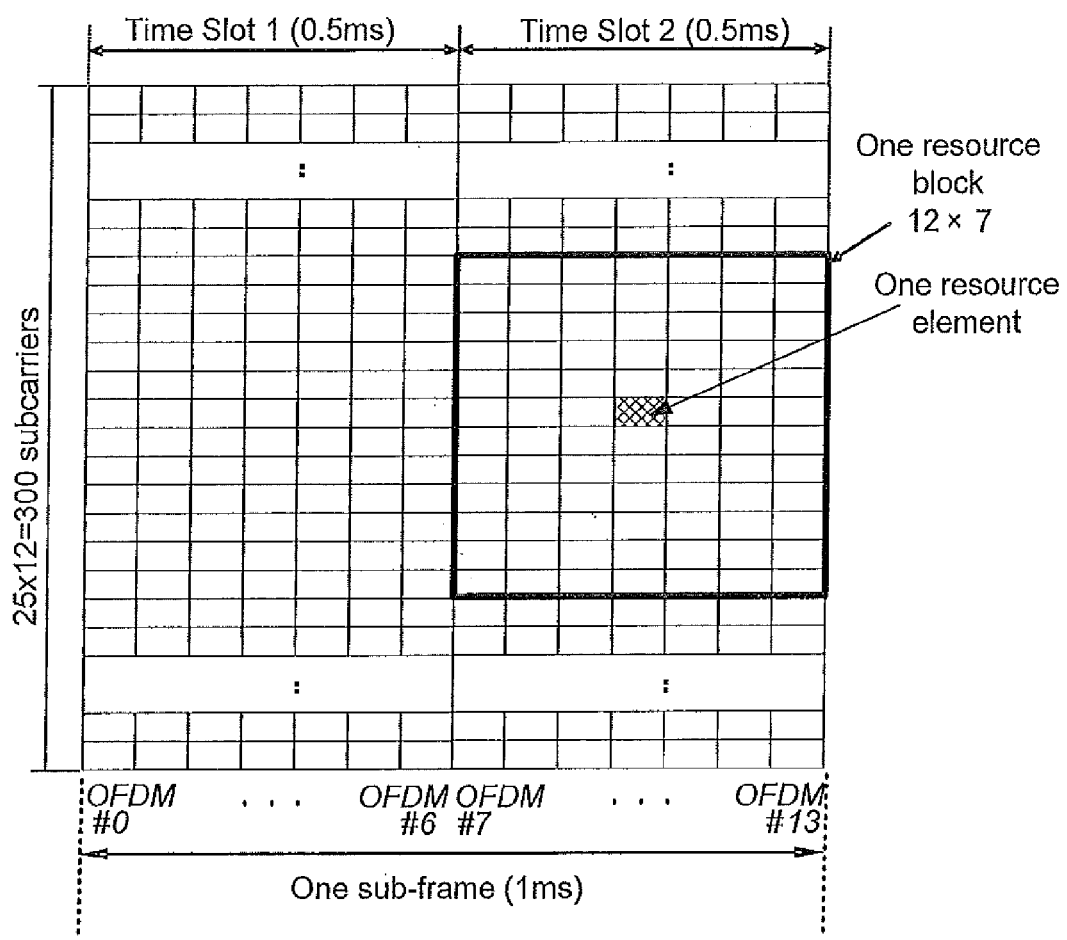
FIG. 1 is a schematic illustration of a resource block and a resource element in a 3GPP LTE (with 5M-bandwidth) system based on relevant technologies.
Figure 2:
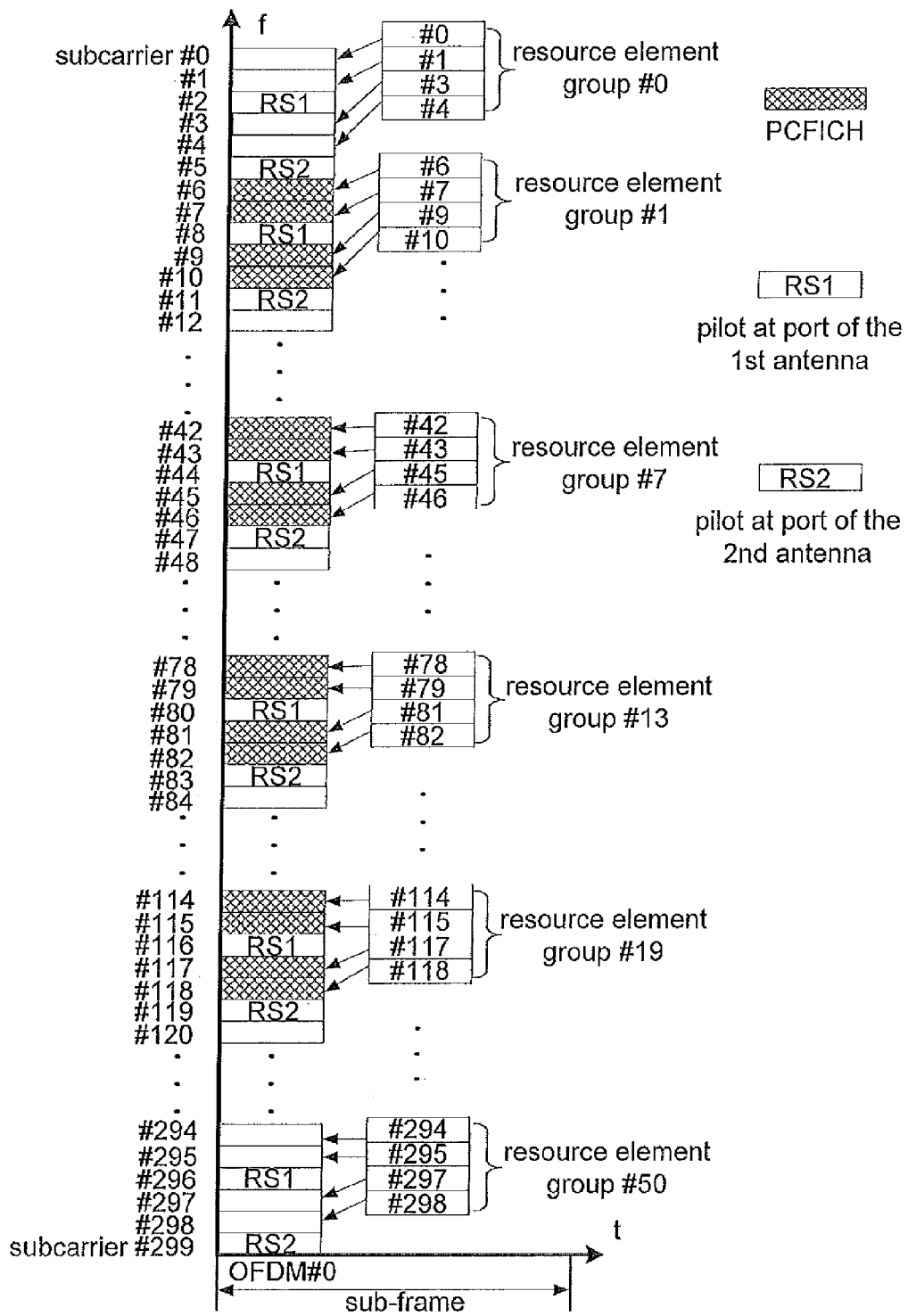
FIG. 2 is a schematic illustration of mapping a physical downlink control format indicator channel in a 3GPP LTE (with 5M-bandwidth) system based on relevant technologies.
Figure 3:
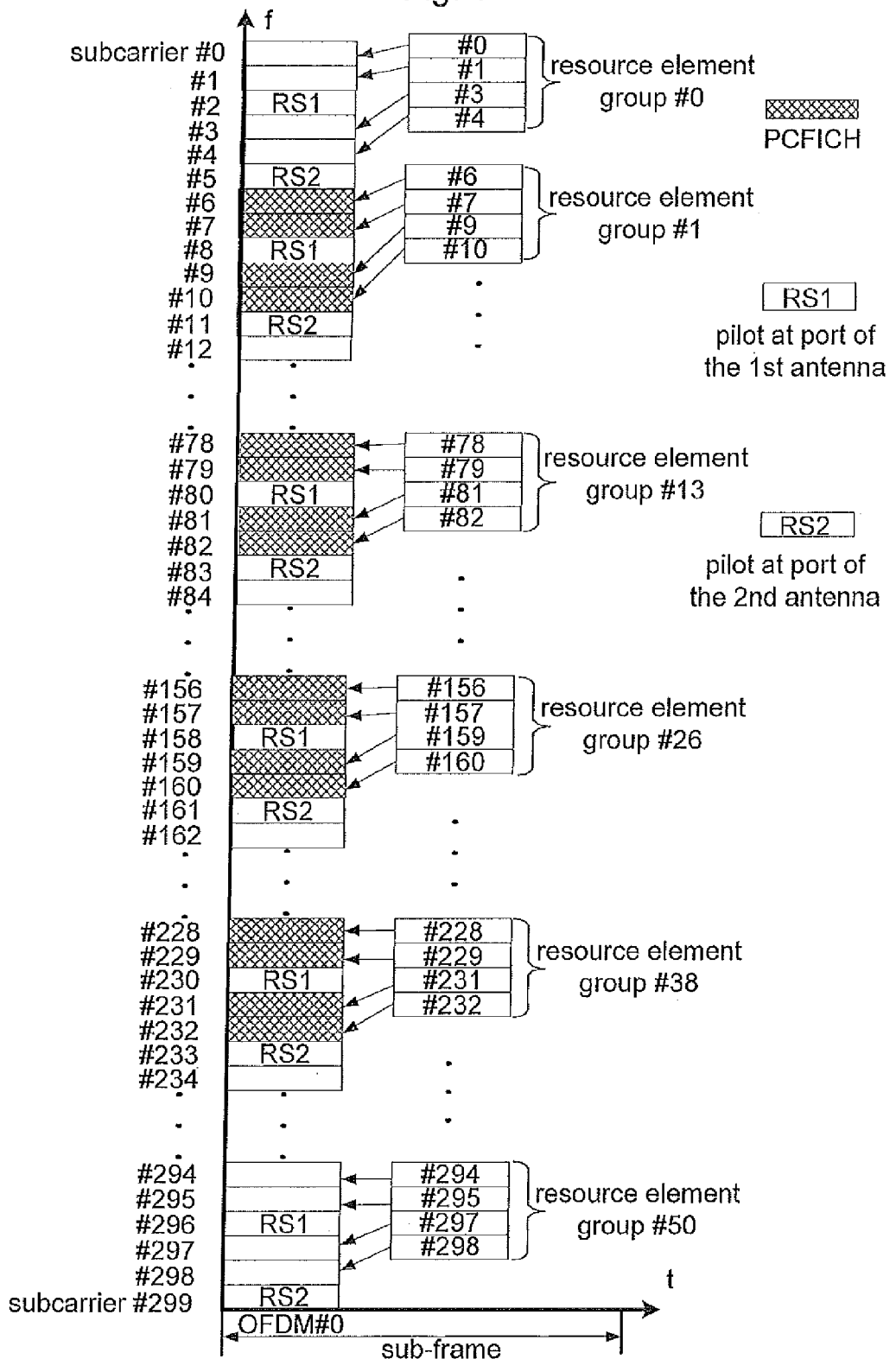
FIG. 3 is a schematic illustration of mapping a physical downlink control format indicator channel in a 3GPP LTE (with 5M-bandwidth) system corresponding to Method (1) based on the embodiments of the present invention.

As shown in FIG. 3, after the above mentioned mapping processing, the code-modulated data $y(0), \ldots, y(15)$ in a physical downlink control format indicator channel are mapped to the resource elements numbered 6, 7, 9, 10 and 78, 79, 81, 82 as well as 156, 157, 159, 160 and 228, 229, 231, 232. The initial position of the physical resources in the physical downlink control format indicator channel lies at the first quarter position of the available bandwidth.

Method (2)

Mapping the data $y(0), \ldots y(15)$ in a physical downlink control format indicator channel to physical resources according to the following method by combining 4 continuous subcarriers in order except the pilots into a group:

$y(0), \ldots y(3)$ are mapped to the resource elements in which a resource element group $k1=k_0 \mod(2 \times N_{RB}^{DL})$ locates;

$y(4), \ldots y(7)$ are mapped to the resource elements in which a resource element group $k2=(k_0+\lfloor N_{RB}^{DL}/2 \rfloor) \mod(2 \times N_{RB}^{DL})$ locates;

$y(8), \ldots y(11)$ are mapped to the resource elements in which a resource element group $k3=(k_0+\lfloor N_{RB}^{DL} \rfloor) \mod(2 \times N_{RB}^{DL})$ locates;

$y(12), \ldots y(15)$ are mapped to the resource elements in which a resource element group $k4=(k_0+\lfloor 3N_{RB}^{DL}/2 \rfloor) \mod(2 \times N_{RB}^{DL})$ locates; and wherein, $k_0=N_{ID}^{cell} \mod(N_{RB}^{DL})$, the $N_{RB}^{DL}$ stands for the quantity of resource blocks in the system bandwidth, and $N_{ID}^{cell}$ is the proprietary ID of each cell.

Figure 4:
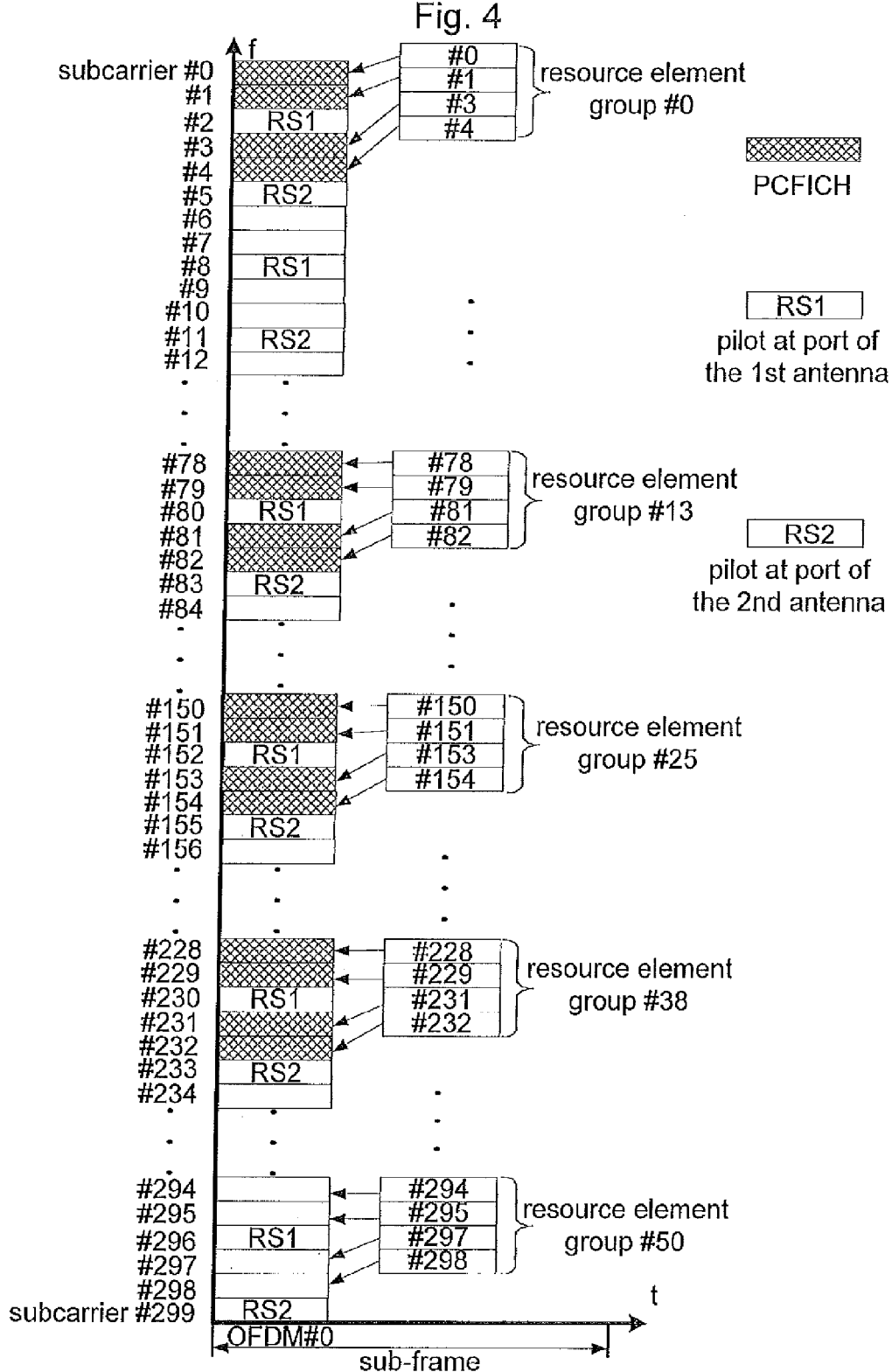
FIG. 4 is a schematic illustration of mapping a physical downlink control format indicator channel in a 3GPP LTE (with 5M-bandwidth) system corresponding to Method (2), Method (3) and Method (4) based on the embodiments of the present invention.

As shown in FIG. 4, after the above mentioned mapping processing, the code-modulated data $y(0), \ldots, y(15)$ in a physical downlink control format indicator channel are mapped to the resource elements numbered 78, 79, 81, 82 and 150, 151, 153, 154 as well as 228, 229, 231, 232 and 0, 1, 3, 4. The initial position of the physical resources in the physical downlink control format indicator channel lies at the first one-half position of the available bandwidth.

Method (3)

Mapping the data $y(0), \ldots y(15)$ in a physical downlink control format indicator channel to physical resources according to the following method by combining 4 continuous subcarriers in order except the pilots into a group:

$y(0), \ldots y(3)$ are mapped to the resource elements in which a resource element group $k1=k_0 \mod(2 \times N_{RB}^{DL})$ locates;

$y(4), \ldots y(7)$ are mapped to the resource elements in which a resource element group $k2=(k_0+\lfloor N_{RB}^{DL}/2 \rfloor) \mod(2 \times N_{RB}^{DL})$ locates;

$y(8), \ldots y(11)$ are mapped to the resource elements in which a resource element group $k3=(k_0+\lfloor N_{RB}^{DL} \rfloor) \mod(2 \times N_{RB}^{DL})$ locates;

$y(12), \ldots y(15)$ are mapped to the resource elements in which a resource element group $k4=(k_0+\lfloor 3N_{RB}^{DL}/2 \rfloor) \mod(2 \times N_{RB}^{DL})$ locates; and wherein, $k_0 N_{ID}^{cell} \mod(2 \times N_{RB}^{DL})$ and the $N_{RB}^{DL}$ stands for the quantity of resource blocks in the system bandwidth, and the $N_{ID}^{cell}$ is the proprietary ID of each cell.

As shown in FIG. 4, after the above mentioned mapping processing, the code-modulated data $y(0), \ldots, y(15)$ in a physical downlink control format indicator channel are mapped to the resource elements numbered 78, 79, 81, 82 and 150, 151, 153, 154 as well as 228, 229, 231, 232 and 0, 1, 3, 4. The initial position of the physical resources in the physical downlink control format indicator channel may lie at any position of the available bandwidth.

Method (4)

Mapping data $y(0), \ldots y(15)$ in a physical downlink control format indicator channel to physical resources according to the following method by combining 4 continuous subcarriers in order except the pilots into a group:

$y(0), \ldots y(3)$ are mapped to the resource elements in which a resource element group $k1=N_{ID}^{cell} \mod(2 \times N_{RB}^{DL})$ locates;

$y(4), \ldots y(7)$ are mapped to the resource elements in which a resource element group $k2=(N_{ID}^{cell}+\lfloor N_{RB}^{DL}/2 \rfloor) \mod(2 \times N_{RB}^{DL})$ locates;

$y(8), \ldots y(11)$ are mapped to the resource elements in which a resource element group $k3=(N_{ID}^{cell}+\lfloor N_{RB}^{DL} \rfloor) \mod(2 \times N_{RB}^{DL})$ locates;

$y(12), \ldots y(15)$ are mapped to the resource elements in which a resource element group $k4=(N_{ID}^{cell}+\lfloor 3N_{RB}^{DL}/2 \rfloor) \mod(2 \times N_{RB}^{DL})$ locates; and wherein, the $N_{RB}^{DL}$ stands for the quantity of resource blocks in the system bandwidth, and the $N_{ID}^{cell}$ is the proprietary ID of each cell.

As shown in FIG. 4, after the above mentioned mapping processing, the code-modulated data $y(0), \ldots, y(15)$ in a physical downlink control format indicator channel are mapped to the resource elements numbered 78, 79, 81, 82 and 150, 151, 153, 154 as well as 228, 229, 231, 232 and 0, 1, 3, 4. The initial position of the physical resources in the physical downlink control format indicator channel may lie at any position of the available bandwidth.

For above mentioned Method (3) and Method (4), the initial position of the physical resources in the physical downlink control format indicator channel may lie at any position of the available bandwidth. More initial positions mean that there are more mapping patterns of the physical downlink control format indicator channel. The more patterns there are, the better randomization degree of mutual interferences among the physical downlink control format indicator channels in neighboring cells will be obtained. For Method (3) and Method (4), only the forms of expression are different, but their mapping positions are the same.

The present invention can offer the maximum gain of frequency domain selectivity by defining group mapping rules to achieve even distribution of data in a physical downlink control format indicator channel over the entire system bandwidth; moreover, no error would arise even when the quantity of available resource blocks is an odd number.

Obviously, those skilled in the art should understand that the individual modules or individual steps in the present invention as mentioned above can be realized by using a general-purpose computing device, that they can be either integrated in a single computing device or distributed over a network comprised of multiple computing devices and that, optionally, they can be realized by using program codes executable by such a computing device so that they can be stored inside a storage device and executed by a computing device, or they can be individually made into individual integrated circuit modules, or they can be realized by making the multiple modules or steps in them into individual integrated circuit modules. In this way, the present invention is not restricted to any specific combination of hardware and software.

The above mentioned are the exemplary embodiments of the present invention only and are in no way intended to limit the present invention. For those skilled in the art, various modifications and changes may be made to the present invention. Any modification, equivalent substitute and improvement within the spirit of the present invention are deemed to be included within the scope of protection of the present invention.

What is claimed is:

1. A method for mapping a physical downlink control format indicator channel to physical resources, the method carried out with respect to resource element groups each comprising four respective resource elements located therewithin, the method carried out with respect to a system bandwidth comprising a quantity of resource blocks, the method carried out with respect to a cell having propriety ID, the method comprising:

mapping data $y(0), \ldots y(15)$ in a physical downlink control format indicator channel to physical resources by combining four contiguous subcarriers in order except the pilots into a group defining a resource element group, the four contiguous subcarriers comprising resource elements respective thereto:

mapping $y(0), \ldots y(3)$ to the resource elements located within a resource element group $k1=k_0$;

mapping $y(4), \ldots y(7)$ to the resource elements located within a resource element group $k2=k_0+\lfloor N_{RB}^{DL}/2 \rfloor$;

mapping $y(8), \ldots y(11)$ to the resource elements located within a resource element group $k3=k_0+\lfloor 2N_{RB}^{DL}/2 \rfloor=k_0+\lfloor N_{RB}^{DL} \rfloor$;

mapping $y(12), \ldots y(15)$ to the resource elements located within a resource element group $k4=k_0+\lfloor 3N_{RB}^{DL}/2 \rfloor$;

wherein, $k_0=N_{ID}^{cell} \mod(\lfloor N_{RB}^{DL}/2 \rfloor)$, and $N_{RB}^{DL}$ is the quantity of resource blocks in the system bandwidth, and $N_{ID}^{cell}$ is the proprietary ID of the cell;

communicating the physical downlink control format indicator channel information by means of a broadband wireless communications system according to the mapping.

2. A method for mapping a physical downlink control format indicator channel to a physical resources, the method carried out with respect to resource element groups each comprising four respective resource elements located therewithin, the method carried out with respect to a system bandwidth comprising a quantity of resource blocks, the method carried out with respect to a cell having a propriety ID, the method comprising:

mapping data $y(0), \ldots y(15)$ in a physical downlink control format indicator channel to physical resources by combining four contiguous subcarriers in order except the pilots into a group defining a resource element group, the four contiguous subcarriers comprising resource elements respective thereto:

mapping $y(0), \ldots y(3)$ to the resource elements located within a resource element group $k1=k_0 \mod(2 \times N_{RB}^{DL})$;

mapping $y(4), \ldots y(7)$ to the resource elements located within a resource element group $k2=(k_0+\lfloor N_{RB}^{DL}/2 \rfloor) \mod(2 \times N_{RB}^{DL})$;

mapping $y(8), \ldots y(11)$ to the resource elements located within a resource element group $k3=(k_0+\lfloor N_{RB}^{DL} \rfloor) \mod(2 \times N_{RB}^{DL})$;

mapping $y(12), \ldots y(15)$ to the resource elements located within a resource element group $k4=k_0+\lfloor 3N_{RB}^{DL}/2 \rfloor) \mod(2 \times N_{RB}^{DL})$;

wherein, $k_0=N_{ID}^{cell} \mod(X*N_{RB}^{DL})$, and $N_{RB}^{DL}$ is the quantity of resource blocks in the system bandwidth, and $N_{ID}^{cell}$ is the proprietary ID of the cell, and X is a positive integer;

communicating the physical downlink control format indicator channel information by means of a broadband wireless communications system according to the mapping.

3. The method of claim 2 wherein X is 1.

4. The method of claim 2 wherein X is 2.

5. A method for mapping a physical downlink control format indicator channel to physical resources, the method carried out with respect to resource element groups each comprising four respective resource elements located therewithin, the method carried out with respect to a system bandwidth comprising a quantity of resource blocks, the method carried out with respect to a cell having a propriety ID, the method comprising:

mapping data $y(0), \ldots y(15)$ in a physical downlink control format indicator channel to physical resources by combining four contiguous subcarriers in order except the pilots into a group defining a resource element group, the four contiguous subcarriers comprising resource elements respective thereto:

mapping $y(0), \ldots y(3)$ to the resource elements located within a resource group $k1=N_{ID}^{cell} \mod(2 \times N_{RB}^{DL})$;

mapping $y(4), \ldots y(7)$ to the resource elements located within a resource group $k2=N_{ID}^{cell}+\lfloor N_{RB}^{DL}/2 \rfloor) \mod(2 \times N_{RB}^{DL})$;

mapping $y(8), \ldots y(11)$ to the resource elements located within a resource group $k3=(N_{ID}^{cell}+\lfloor N_{RB}^{DL}/2 \rfloor) \mod(2 \times N_{RB}^{DL})$;

mapping $y(12), \ldots y(15)$ to the resource elements located within a resource group $k4=(N_{ID}^{cell}+\lfloor 3N_{RB}^{DL}/2 \rfloor) \mod(2 \times N_{RB}^{DL})$;

wherein $N_{RB}^{DL}$ is the quantity of resource blocks in the system bandwidth, and $N_{ID}^{cell}$ is the proprietary ID of the cell;

communicating the physical downlink control format indicator channel information by means of a broadband wireless communications system according to the mapping.

* * * * *